United States Patent [19]

Holz

[11] 4,167,438
[45] Sep. 11, 1979

[54] METHOD AND APPARATUS FOR PREPARING AND CLEANING FIBROUS MATERIAL

[75] Inventor: Emil Holz, Eningen Unter Achalm, Fed. Rep. of Germany

[73] Assignee: Hermann Finckh Maschinenfabrik, Fed. Rep. of Germany

[21] Appl. No.: 868,386

[22] Filed: Jan. 10, 1978

[30] Foreign Application Priority Data

Jan. 18, 1977 [DE] Fed. Rep. of Germany ....... 2701737

[51] Int. Cl.² .................... D21D 5/02; D21D 5/20; D21D 5/22
[52] U.S. Cl. ................................... 162/4; 162/55; 209/17; 209/211; 209/273
[58] Field of Search ................ 162/4, 52, 55; 209/10, 209/17, 211, 273

[56] References Cited

U.S. PATENT DOCUMENTS

| 3,873,410 | 3/1975 | Chupka | 162/4 |
| 3,964,996 | 6/1976 | Holz et al. | 209/17 |
| 4,107,033 | 8/1978 | Holz | 162/4 |
| 4,111,373 | 9/1978 | Holz | 209/273 X |

FOREIGN PATENT DOCUMENTS 1461090 10/1970 Fed. Rep. of Germany.

OTHER PUBLICATIONS

Hutzler, "A New Screen for Wastepaper Systems" TAPPI, vol. 58, No. 11, Nov. 1975, pp. 68–70.

Primary Examiner—Richard V. Fisher
Attorney, Agent, or Firm—Leydig, Voit, Osann, Mayer & Holt, Ltd.

[57] ABSTRACT

A method and a system for cleaning and classifying fibrous suspensions whereby the suspension, by screening, is divided into a first stream of accepted stock and a second stream of rejected stock. The latter is then screened once more and thereby divided into a third stream of accepted stock and a fourth stream of rejected stock. The third stream is added to the first stream, whereas only the fourth stream is subjected to a fibre flake break-up process followed by a further screening process resulting in a stock finally rejected and an accepted stock added to the fibrous suspension upstream of the means for carrying out the first screening.

16 Claims, 8 Drawing Figures

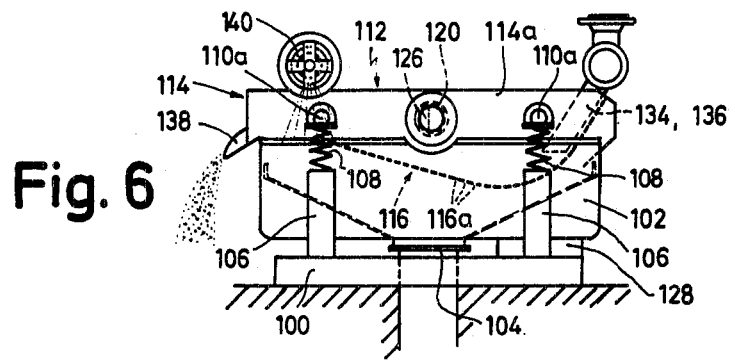
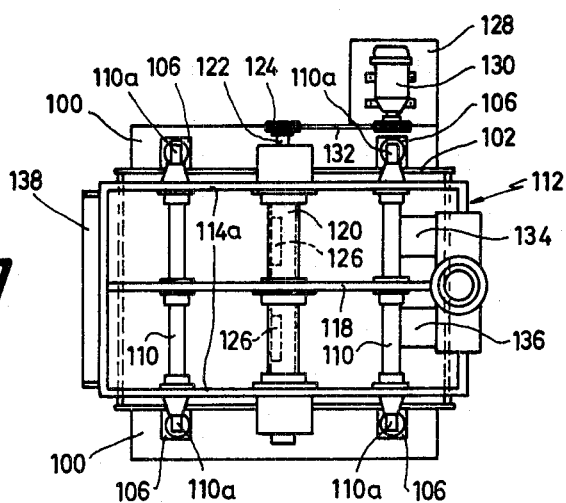
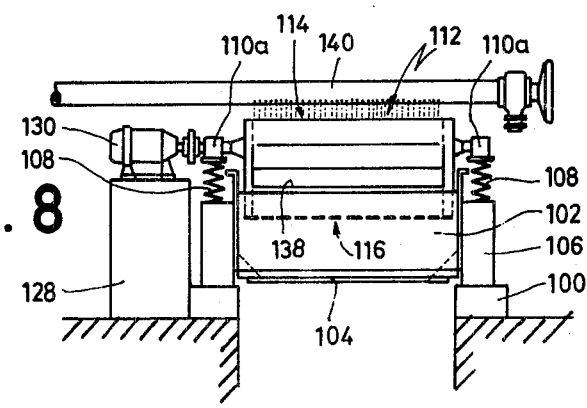

METHOD AND APPARATUS FOR PREPARING AND CLEANING FIBROUS MATERIAL

The invention relates to a method of preparing and cleaning fibrous material, in particular mixed waste paper, in which the fibrous material is first processed in a pulper and the fibre suspension produced thereby is divided into a stream of accepted stock and a stream of rejects, whereupon the latter is subjected to a fibre flake break-up process. Furthermore the invention relates to apparatus for performing such a method which comprises a pulper device for coarsely defibreing the fibrous material, a main stream pressure screen connected beyond the latter, and a deflaker device disposed in a return line, wherein the rejects outlet of the main stream pressure screen is connected to the deflaker device.

Figure 2:
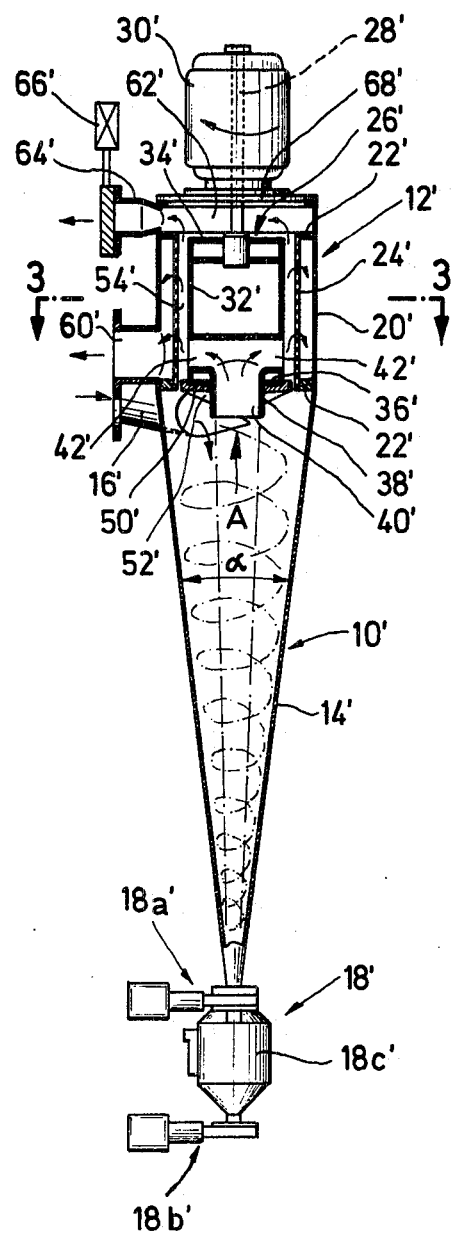

As may be seen e.g. from FIG. 2 of "A new screen for wastepaper systems", Tappi, Vol. 58, No. 11, November 1975, pp. 68–70, it was usual heretofore in apparatus of the kind referred to above to feed the entire reject material from a pressure screen following the pulping device and operating in the high consistency range to a fibre-separating deflaker device in order to segregate non-dissolved fibres, i.e. to break up the rejects. Thereupon this portion of the fibre suspension was supplied to a high density power vibrator or Jonsson Screen in order to sort out the broken-down fibre suspension; the accepted stock from the power vibrator was subsequently passed into the pulping device. The same applies also to the preparation of the fibre suspension in the low consistency range, where the rejects outlet of a pressure screen operating in the low consistency range is followed by a fibre separating deflaker device which has to process the entire rejects material of this pressure screen. The outlet of this deflaker device was sorted again by means of a low density power vibrator or Jonsson Screen and the accepted stock of this power vibrator was added to the accepted stock of the low consistency pressure screen or returned to the inlet of the latter.

The inventor has now found that in the known preparation methods described large portions of the fibre suspension were quite unnecessarily subjected to processing steps which require energy and moreover harbour in them the risk of damage to the fibres: namely it has been found that the rejects material of e.g. the pressure screen operating in the high consistency range contains approximately 70% good fibres and only approximately 30% non-dissolved or non-defibred particles, so that 70% of the fibre suspension need not be fed to the deflaker or defibrator device nor to the pulping device again. However considerable amounts of energy must be employed for the operation of the fibre-separator device as well as for the drive of the pulping device, and moreover there exists the risk that the good fibres are damaged in the fibre separator device or deflaker and in the pulping device.

The problem on which the invention is based, to improve methods of the kind referred to above in such a manner that they may be performed in more energy-saving manner, is now solved according to the invention in that a further pressure screen for the rejects material is provided between the rejects outlet of the main stream pressure screen and the fibre separator or deflaker device, and its screen comprises openings of smaller dimensions than that of the main stream pressure screen and its rejects space is in connection with the fibre separator device. By means of the further sorting out of the rejects material not only the major portion of the fibre suspension is branched off ahead of the fibre separator device so that the latter—and, in the case of the treatment of the rejects material of a pressure screen operating in the high consistency range, also the preceding pulping device—is supplied with a smaller quantity of fibre suspension and therefore less energy must be provided for its operation, but also the good fibres of the rejects material are not subjected unnecessarily to a further mechanical treatment step and therefore not to the risk of injury, and finally the invention imports the advantage that the fibre separator device in the apparatus according to the invention is fed with a fibre suspension of higher substance density than in the known apparatus, which leads to an increase of the degree of efficiency of the fibre separator device.

When above reference is made to the high consistency and low consistency range, it is to be understood thereby that the substance density of the fibre suspension in the one case is greater and in the other case smaller than approximately 2%.

The rejects material pressure screen and the fibre separator or deflaker device could involve two separate devices, however a constructional form is preferred in which a single device first sorts and removes water, and then separates the fibres or fibre flakes or effects particle break-down, and a preferred embodiment of such a device is described in U.S. patent application Ser. No. 776,520 filed Mar. 10, 1977 and now U.S. Pat. No. 4,111,373.

When, as is preferred, the screen openings of the rejects material pressure screen comprise smaller dimensions than those of the associated main stream pressure screen, it is advisable to combine the accepted stock output of the rejects material pressure screen and the accepted stock output of the main stream pressure screen, whereas like in the known apparatus the outlet of the fibre separator device is connected to a sorting device, in particular a power vibrator, likewise disposed in the return line, in order not to feed the dirt contained in the rejects material of the main stream pressure screen again to the pulping device or the fibre suspension. Namely in spite of the accumulation of the dirt in the rejects material smaller openings in the screen of the rejects pressure screen ensure that the accepted stock thereof has the same quality as the accepted stock of the main stream pressure screen.

As may be clear already from the preceding statements, the basic idea of the invention may be employed also for sorting out in the low consistency range. Thus in apparatus in which sorting out is effected first in the high consistency range and then in the low consistency range, according to the invention a first main stream pressure screen operating in the high consistency range is provided the rejects material outlet of which is connected to a first rejects material pressure screen the rejects chamber of which is in connection with a fibre separator device, and the accepted stock outlet of the first main stream pressure screen and the accepted stock outlet of the first rejects material pressure screen is connected to at least one second main stream pressure screen operating in the low consistency range, the rejects material outlet of the latter screen being connected to a second rejects material pressure screen the accepted stock outlet of which communicates with the accepted stock outlet of the second main stream pressure screen. Here too, it will be advisable again to connect the rejects chamber of the second rejects material pressure screen to a second fibre separator device the outlet of which communicates with the accepted stock outlet of the first main stream pressure screen in order not to be compelled to discard the particles contained in the rejects material of the pressure screen operating in the low consistency range. Moreover it is advisable to connect the outlet of the second fibre separator device likewise to a sorting-out device, in particular a low density power vibrator operating in the low consistency range and to sort out before the deflaked rejects material is returned to the main stream again.

Furthermore, in a preferred embodiment of apparatus according to the invention incorporating sorting-out in the low and high consistency range, it is advisable to operate in the high consistency range with screens with holes, but in the low consistency range with slots in the screens, whereby improved sorting-out results are obtained.

Figure 1:
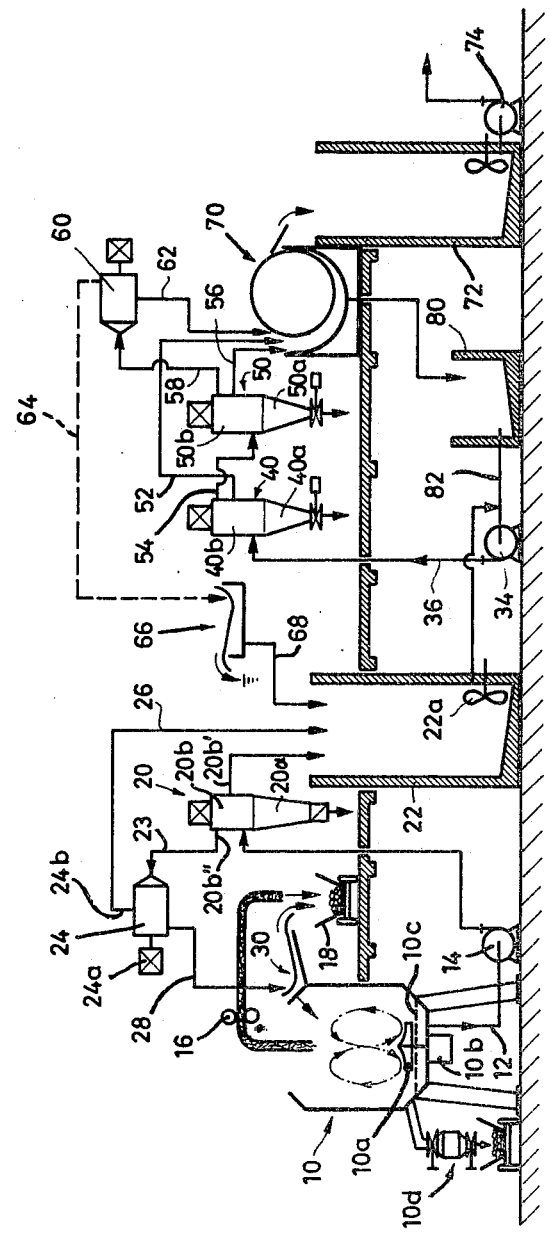
Figure 3:
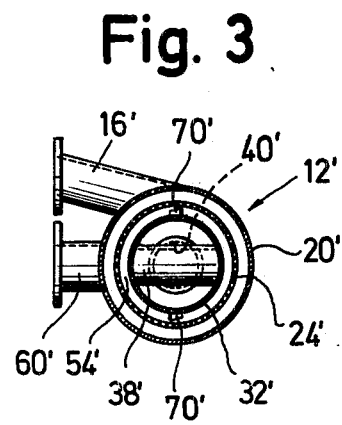
Figure 4:
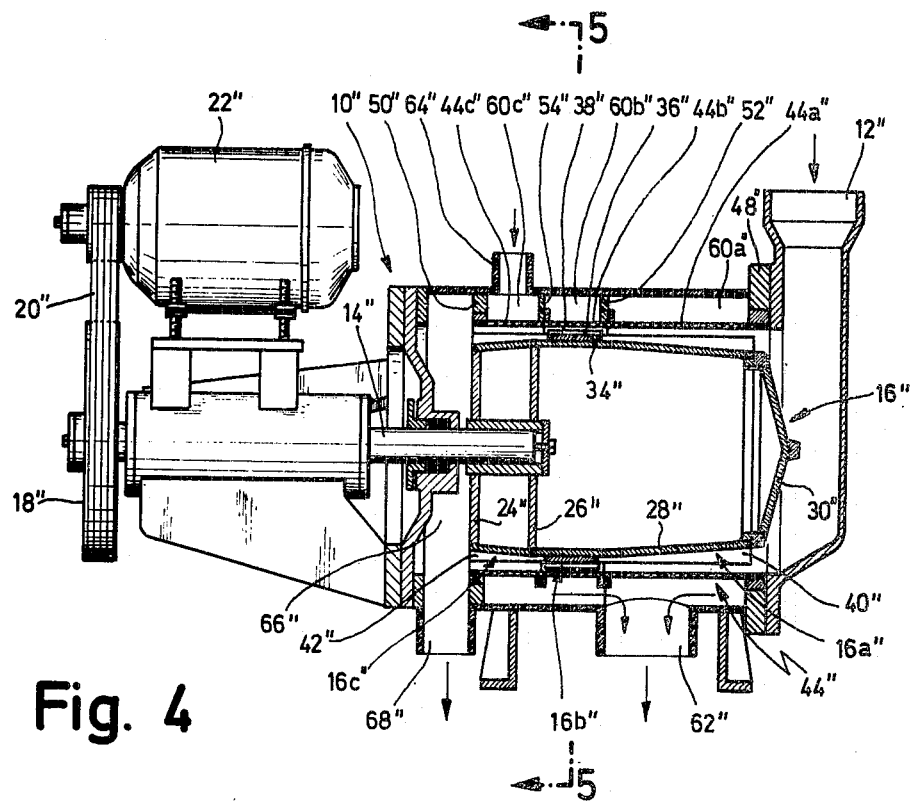
Figure 5:
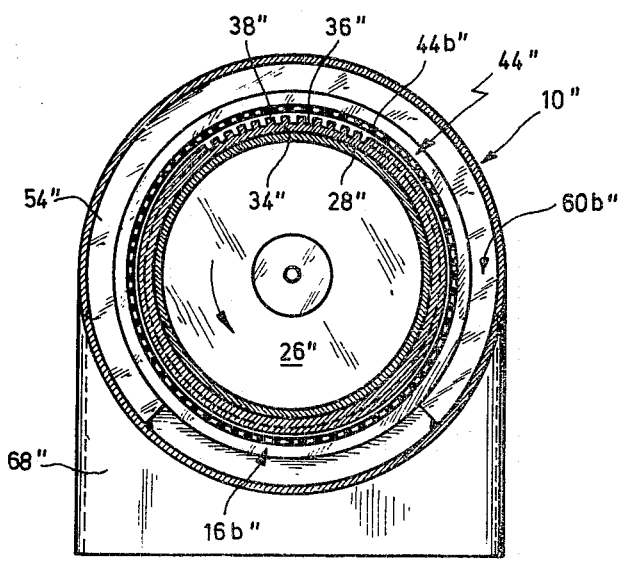

The invention is to be explained in detail below with reference to the accompanying drawings, further features and advantages of the invention being obtainable from the following description and the accompanying claims; there are shown in:

FIG. 1 a preferred constructional form of the apparatus according to the invention, in diagrammatic illustration;

FIG. 2 an axial section through a pressure screen, such as it may be employed in the apparatus according to FIG. 1;

FIG. 3 a section on the line 3—3 in FIG. 2 through this pressure screen;

FIG. 4 an axial section along a vertically extending plane through a device which constitutes a combination of pressure screen and fibre separator or deflaker device;

FIG. 5 a section on the line 5—5 in FIG. 4 through the device according to FIG. 4;

FIG. 6 a side view of a power vibrator (vibrating screen or Jonsson screen) usable in the apparatus according to FIG. 1;

FIG. 7 a view from above on this power vibrator, and

FIG. 8 a view of that end of this power vibrator at which dirt and other soiling matter are ejected.

FIG. 1 illustrates as a first apparatus a substance dissolver 10, also referred to as pulping device, which is to involve a wet dissolver which serves for coarsely dissolving or defibreing the fibrous material supplied thereto. Such pulping devices are known, so that below merely brief reference is made to its construction. It comprises a rotor 10a which rotates about a vertical axis and which is driven by an electromotor 10b; it ensures circulation of the fibrous material in the pulping device, as indicated by the arrows. A screen bottom 10c is located below the rotor 10a, so that a fibre suspension can be drawn off under the screen bottom of the pulping device by means of a pump 14 through a pipe 12 at the bottom of the device. The heavy particles which occur even during the preparation of waste paper and which are unable to pass through the screen bottom 10c—for example parts of iron and glass bottles, stones and the like—are withdrawn from the pulping device 10 through a so-called heavy particle gate 10d. Material which cannot be dissolved by the pulping device and cannot pass through the screen bottom 10c, is drawn off in the usual manner by means of a so-called pigtail winch 16 in the form of a ribbon and supplied to a waste container 18.

The next-following device of the apparatus according to the invention comprises a pressure screen 20b operating in the high consistency range which is built together with a tubular centrifuge 20a also called cleaner; the whole device is to be referred to below as a main stream high consistency screen 20 operating in the high consistency range. Such pressure screens for the high consistency range as well as for the low consistency range are already known and are described for example in the U.S. Pat. No. 3,964,996 as well as the U.S. patent application Ser. No. 777,065 filed Mar. 14, 1977 and now U.S. Pat. No. 4,107,033. Such apparatus is to be described below with reference to FIGS. 2 and 3. At the bottom of the tubular centrifuge 20a specifically heavy dirt is drawn off, which is indicated by an arrow, and the portion of the fibre suspension which can pass through the screen of the high consistency screen 20b ("first partial stream") travels through an accepted stock outlet 20b' into a vessel 22. The other portion ("second partial stream") of the fibre suspension which cannot pass through the screen openings of the screen 20b leaves the main stream pressure screen 20 at a rejects material outlet 20b"; this portion of the fibre suspension contains specifically light dirt, non-dissolved fibre accumulations or fibres not separated from each other, i.e. so-called flakes, but for the major part good and previously dissolved fibres—the last mentioned proportion of the rejects material amounts to e.g. 70%, whereas 30% of the fibre suspension contain non-dissolved fibre accumulations and the proportion of dirt is very small (it amounts to approximately 3%).

The rejects material of the main stream pressure screen 20 is then fed to a device 24 which involves a combination of pressure screen and fibre separator or deflaker device, namely preferably a device such as is described in the U.S. patent application Ser. No. 776,520 above (U.S. Pat. No. 4,111,373) and will be described below in detail with reference to FIGS. 4 and 5. The rotor not shown in FIG. 1 of this device is driven by a motor 24a. In this device the rejects material supplied through a pipe 23 is first sorted out once more and simultaneously relieved of water, so that approximately 70% of the fibre suspension arriving therein as rejects material leaves ("third partial stream") the device 24 through an accepted stock outlet and is fed through a pipe 26 to the vessel 22. The remainder ("fourth partial stream") is treated in a second stage of the device 24 to break up flakes or separate the fibres and leaves the device through a pipe 28 which feeds the suspension containing dirt and the fibres of broken-up flakes to a high density power vibrator 30 which is preferably built into the casing of the pulping device 10. There the suspension is sorted out once more. The accepted stock ("fifth partial stream"), as indicated by an arrow, returns to the pulping device 10, whereas the dirt ("sixth partial stream") travels into the waste container 18.

In the preferred embodiment of the apparatus according to the invention, the high consistency screen 20b is to possess a screen basket the openings of which are constructed in the form of holes, and the same applies to the pressure screen part of the device 24, but the holes of the latter should have smaller dimensions than those of the thick material screen 20b.

The fibre suspension travels from the vessel 22 which is provided with the stirrer propeller 22a in front of a pump 34 from where it is fed through a pipe 36 to a main stream pressure screen 40 operating in the low consistency range. This screen 40 is followed by another main stream pressure screen 50 which operates likewise in the low consistency range, and both devices are to consist of a tubular centrifuge 40a and 50a, respectively, forming the lower part of the device, and a low consistency screen 40b and 50b, respectively, forming the upper part of the device, in the same manner as the pressure screen 20. These devices, too, may again have a construction such as it will be described still with reference to FIGS. 2 and 3.

However, their screen baskets are to have openings of smaller dimensions than the screen basket of the high consistency screen 20b. Moreover, the openings of the screen baskets of the low consistency screens 40b and 50b entail preferably slots.

Initially heavy particles are separated out of the fibre suspension supplied through the pipe 36, by means of the tubular centrifuge 40a and are drawn off at the bottom—such as indicated by an arrow. Thereupon the fibre suspension is sorted out in the upper part of the device, the accepted stock leaves the low consistency screen 40b through the accepted stock outlet thereof and a pipe 52, whereas the specifically lighter dirt and rejects material containing still insufficiently dissolved fibre accumulations are fed through a pipe 54 to the second main stream pressure screen 50 for the purpose of further sorting out. The accepted stock outlet of the latter screen is connected to a pipe 56, whereas its rejects material outlet is connected to a pipe 58 which leads to a device 60 which corresponds to the device 24 and consists of a pressure screen as well as a fibre separator device. This device also may have a construction such as it will be described later with reference to FIGS. 4 and 5. Thus in this device the rejects material of the two-stage sorting device for the low consistency range which consists of the two main stream pressure screens 40 and 50 receives after-treatment, that is to say first it is screened once more and condensed and then deflaked. The accepted stock of the pressure screen stage of the device 60 leaves the same through a pipe 62, whereas the outlet of the fibre separator device is connected to a pipe 64 which leads to a low consistency power vibrator 66. The accepted stock outlet of this power vibrator is connected to the vessel 22 by means of a pipe 68; the dirt separated by means of the power vibrator is discarded.

Finally the accepted stock supplied through the pipes 52, 56 and 62 is concentrated in a usual concentrator 70 and then delivered into a vessel 72 from where it may be conveyed by means of a pump 74 to a paper making machine not illustrated.

The screen basket of the pressure screen part of the device 60 comprises also preferably slots the width of which is less than the slot width in the screens 40b and 50b. The screen of the power vibrator 66 may have slots or holes.

The water removed from the fibre suspension by means of the concentrator 70 travels into a vessel 80 from where it is added to the fibre suspension to be prepared in the low consistency range, by means of a pipe 82 and the pump 34.

The sorting device denoted in toto by 20 or 40 or 50, respectively, in FIG. 1 consists, according to FIGS. 2 and 3, of a tubular centrifuge 10' and the pressure screen 12' proper, the latter being deposited on the top of the tubular centrifuge. This possesses a conical casing 14' which comprises at the top an inlet in the form of a tangentially terminating tube 16' and at the bottom a dirt gate 18' denoted in toto by 18'. The latter has a known construction and comprises two pneumatic slider members 18a' and 18b' between which a dirt container 18c' is disposed. This dirt gate permits continuous dirt removal, for which purpose first the slider member 18a' is opened so that dirt collected at the bottom in the casing 14' of the tubular centrifuge can drop into the dirt container 18c'. Thereupon the slider member 18a' is closed and the slider member 18b' is opened in order to empty the dirt container.

The pressure screen 12' possesses a cylindrical casing 20' in which a likewise cylindrical screen basket 24' is held between rings 22'. In this screen basket rotates a rotor which is denoted in toto by 26' and which is supported by the driving shaft 28 of an electro-motor 30' mounted on the casing 20'. It has a substantially circular-cylindrical configuration with a circular-cylindrical jacket 32', a cover 34' closing the rotor at the top, and a circular ring-shaped bottom 36' into which is inserted a T-shaped tubular member 38' which defines on the underside of the rotor an inlet opening 40' and at the periphery two mutually oppositely disposed outlet openings 42' and comprises according to the invention rounded transitions between the duct leading upwardly from the inlet opening 40' and the transverse duct connecting together the outlet openings 42'.

The bottom 36' of the rotor has a support ring 50' attached thereto the downwardly directed face of which has the shape of a truncated cone and carries accelerator ledges 52' which extend in a radial direction and which, as may be seen from FIG. 2, are of approximately triangular shape. The ring gap or ring space 54' between the jacket 32' of the rotor and the screen basket 24' should be nearly closed at the bottom by a gap seal formed by the support ring 50', so that an intermediate space results between the periphery of the support ring 50' and the screen basket 24' which is just of such a width that the dirt particles contained in the fibre suspensions leaving the tubular centrifuge 10' do not lead to excessively high wear.

Outside the screen basket 24' a tube forming an accepted stock outlet 60' is welded to the casing 20', whereas a rejects material chamber 62' of the pressure screen 12' terminates in a tube 64', the chamber being located above the rotor 26'; the tube 64' is closed by means of a pneumatically actuated slider valve 66'.

Finally a cover which supports the electro-motor 30' and which closes the top of the pressure screen casing has been denoted by 68'.

The fibrous material suspension to be cleaned and screened is introduced into the tubular centrifuge 10' through the tube 16' forming an inlet, the fibrous material suspension in the tubular centrifuge being set in strong circulatory motion not only thanks to the tangential course of the tube 16', but above all in consequence of the high rotary speed of the rotor 26' and thus the accelerator ledges 52'. Thereby a helical downwardly directed stream is formed in the tubular centrifuge which is responsible for the fact that specifically heavy dirt particles and specifically relatively light dirt particles of a certain minimum size collect in the outer region of the tubular centrifuge and then settle in the lower end thereof so that they can be drawn off through the dirt gate 18'. The cleaned fibrous material suspension rises upwardly in the centre of the tubular centrifuge 10' and enters the rotor 26' through the inlet opening 40', and thus also the pressure screen 12'.

The major portion of the water of the fibrous material suspension together with the useful fibre proportion leaves the device through the screen basket 24' and through the accepted stock outlet 60', whereas the so-called rejects material flows upwardly through the ring space 54' into the rejects material chamber 62' and may be drawn off from there either continuously or discontinuously through the tube 64'.

It is also advantageous when the rotor 26' is provided on its periphery with projections, in particular displacer ledges 70' visible in FIG. 3 which, in relation to the axial direction of the rotor, are arranged slightly inclined in such a manner that taking the direction of rotation of the rotor into account they effect a conveying effect towards the top. Moreover it is a purpose of the displacer ledges 70' to permit pressure shocks to act upon the openings of the screen basket 24', in order to prevent these openings from clogging in a known manner.

Thus the pipes 12, 36 and 54 are connected to the tubes 16' of the devices 20,40 and 50 the construction of which is clear from FIGS. 2 and 3. The accepted stock outlets of these devices denoted in FIG. 1 by 20b', 52 and 56 are identical with the accepted stock outlets 60' therefore according to FIGS. 2 and 3, and the rejects material outlets 23, 54 and 58 of FIG. 1 are identical with the tubes 64' according to FIG. 2.

The device denoted in FIG. 1 by 24 and 60, respectively, comprises according to FIGS. 4 and 5 a multiple part casing which is denoted in toto by 10" and which possesses at the one end an upwardly directed tube which forms an inlet 12" for the fibre stock suspension to be processed. On the other side a horizontally extending shaft 14" is rotatably mounted in the casing 10" and supports at its one end a rotor denoted in toto by 16" and at its other end a belt pulley 18" by means of which and a driving belt 20" the rotor can be driven by an electro-motor 22".

The shaft 14" has attached thereto two support discs 24" and 26" which support an approximately barrel-shaped jacket 28" of the rotor, the former supporting in turn a conically shaped cover 30" which closes the rotor at the inlet end, whereas the support disc 24" closes the other end of the rotor. The barrel shape of the rotor 16" is produced owing to the fact that the jacket 28" is circular-cylindrically in a middle portion and is of truncated cone-shape in the adjacent end regions, so that it defines at the end of the inlet 12" a first truncated cone-shaped rotor zone 16a", adjacent thereto a second circular cylindrical rotor zone 16b" and finally a third again truncated cone-shaped rotor zone 16c".

As may be seen from FIG. 4 in particular in conjunction with FIG. 5, the second rotor zone 16b" supports a ring 34" which possesses on its periphery longitudinal ribs 38" separated from each other by grooves 36" extending in an axial direction. This ring is followed on both sides by accelerator ledges 40" and 42" which extend also in an axial direction.

The rotor 16" centrally disposed in the casing 10" rotates within a hollow cylinder denoted in toto by 44" which is concentrically retained in the casing and which is in the form of a stationary screen basket. Corresponding to the three rotor zones, the hollow cylinder also has a first, a second and a third ring zone 44a", 44b" and 44c" which are defined by rings 48" and 50" retaining the hollow cylinder, as well as by approximately C-shaped ring segments 52" and 54". These rings and ring segments limit also from each other three ring spaces 60a", 60b" and 60c" which are located between the hollow cylinder 44" and the peripheral wall of the casing 10". It is to be noted here that the ring spaces 60a", 60b" and 60c" are in connection with each other in the lower part of the device because of the C-shaped configuration of the ring segments 52" and 54".

Below the first ring zone 44a" of the hollow cylinder 44" the peripheral wall of the casing 10" has a so-called accepted stock outlet 62", whereas in the region of the third ring zone 44c" a tube 64" is inserted in the top of the peripheral wall of the casing 10" and forms an inlet for diluting water.

Finally, adjacent the end of the rotor 16" remote from the inlet 12", the casing 10" possesses a so-called rejects material chamber 66" into the bottom of which terminates a rejects material outlet 68".

Since the inlet 12" terminates from above into the casing space receiving the rotor 16", it is unnecessary to supply the fibrous material suspension to be processed to the device according to the invention under pressure. This fibrous material suspension is now efficiently dehydrated in a dehydration zone between the first rotor zone 16a" and the first ring zone 44a" of the screen basket or hollow cylinder 44", since the suspension is set in a strong circulatory motion by the accelerator ledges 40" of the rotor 16" which rotates at a high speed. The rotary speed of the rotor, the length of the first rotor zone and the first ring zone as well as the width of the ring space located therebetween are conveniently so adjusted to each other that the fibrous material suspension is concentrated in such a manner that upon leaving the dehydration zone it has a substance density of e.g. approximately 3 to 6% which is suitable for particle break-up. The openings of the first ring zone 44a" of the hollow cylinder 44" are adjusted to the openings of the screen basket of the preceding pressure screen.

The concentrated suspension of fibrous material travels then into the region of a particle break-up zone which is formed by the ring 34" and the second ring zone 44b" of the hollow cylinder 44". In this particle break-up zone the ring space between the rotor and the hollow cylinder is extremely narrow, and particles and fibre accumulations are efficiently dissolved by the longitudinal ribs 38" as well as the grooves 36", which would not be the case without the previous concentration of the fibrous material suspension.

Finally the particle-free fibrous material suspension travels into a washing or sorting zone between the third rotor zone 16c" and the third ring zone 44c". Thanks to the barrel shape of the rotor a sufficiently large volume is available in this washing or sorting zone, in order to wash out dirt particles by means of diluting water supplied through the tube 64" and to separate them from good fibres and to provide the optimum substance density for subsequent sorting out. Thanks to the accelerator ledges 42" the fibrous material suspension is accelerated in the washing or sorting zone to such a high rotary speed that the supply of the diluting water does not lead to the effect that the fibrous material suspension is swept directly into the rejects material chamber 66". In the third ring zone 44c" also the hollow cylinder 44" has fine holes or slots.

The accepted stock which has flown through the openings of the ring zones 44a", 44b" and 44c" combines now in the lower part of the casing and flows away through the accepted stock outlet 62". In contrast the dirt washed out travels into the rejects material space 66" and is drawn off through the rejects material outlet 68".

Thus the pipes 23 and 58 of FIG. 1 lead always to the inlet 12" of a device according to FIGS. 4 and 5, the accepted stock outlet 62" of this device is connected to the pipe 24b or 62, respectively, and the rejects material outlet 68" of this device is connected to the pipe 28 or 64, respectively.

Below a power vibrator, such as it may be used as a device 30 or 66 in the apparatus according to FIG. 1, is to be explained in detail with reference to FIGS. 6–8.

Such a power vibrator possesses a foundation 100 on which a trough-like container 102 is stationarily mounted. This has at the bottom an accepted stock outlet 104 and it is arranged between four columns 106. These support by way of springs 108 and the ends 110a of two support rods 110 a screen tub 112 which consists of a box-like upper part 114 with side walls 114a, an arcuate bottom 116 constructed as a screen plate, and a centre wall 118 serving for stiffening; the openings 116a of the screen tub bottom may involve fine holes or slots.

The support rods 110 are fixed in the side walls 114a and the centre wall 118 of the screen tub 112; moreover a drive tube 120 is rotatably mounted there and its one end is connected to an axle stub 122 supporting a belt pulley 124. Unbalance weights 126 are eccentrically fixed in the interior of the drive tube, so that the screen tub 112 can be excited to perform elliptical oscillations by a rotation of the drive tube 120.

A plinth 128 supports an electro-motor 130 which drives the belt pulley 124 by means of a driving belt 132, namely in such a rotary direction that solid particles, such as dirt, the size of which does not exceed the size of the openings 116a, migrate, after they have settled on the bottom 116 of the screen tub 112, from the right to the left in FIG. 6 owing to the oscillations of the screen tub.

The suspension to be screened is delivered, e.g. through two inlet tubes 134 and 136, into the parts of the screen tub 112 disposed on the right and on the left of the centre wall 118. Whereas the useable fibres together with the water pass through the openings 116a and flow away through the accepted stock outlet 104, dirt and other particles of excessive size are retained by the screen tub bottom 116 and migrate to the outlet of the tub 138 in consequence of the oscillations thereof. In order to wash off good fibres adhering to this so-called rejects material, a spray tube 140 is arranged transversely above the outlet end of the screen tub 112 and sprays water through openings provided on its underside on to the rejects material, so that good fibres are washed back into the screen tub.

Thus when the power vibrator illustrated in FIGS. 6 to 8 is built into the apparatus according to FIG. 1, the pipes 28 and 64 are connected to the inlet tubes 134 and 136 of a respective power vibrator, and the outlet 104 of the power vibrator 30 (see FIG. 1) leads back to the pulping device 10 in order to dissolve fibrous material which may possibly not have been opened up yet.

I claim:

1. Method of preparing and cleaning fibrous suspensions, wherein the fibre suspension is divided by sorting out into a stream of accepted stock and a stream of rejects material, whereupon the latter is subjected to a fibre flake break-up process, characterized in that the rejects material stream is sorted once more prior to the fibre flake break-up process and is concentrated and merely the rejects material resulting from the after-sorting is treated for fibre flake break-up.

2. A method of preparing and cleaning fibrous suspensions containing agglomerates of fibres, said method comprising the steps of dividing a feed stream of a fibrous suspension by screening into a first partial stream of accepted stock and a second partial stream of rejected stock; screening said second partial stream and thereby dividing the same into a third partial stream of accepted stock and a fourth partial stream of rejected stock, the latter comprising said fibre agglomerates and having a higher stock density than that third partial stream; breaking up said fibre agglomerates in said fourth partial stream and subsequently screening the same, thereby dividing it into a fifth partial stream of accepted stock and a sixth partial stream of rejected stock, and adding said fifth partial stream to said feed stream.

3. Apparatus for preparing and cleaning fibre suspensions, with a main stream pressure screen and a deflaker device with an outlet into a return line, the rejects material outlet of the main stream pressure screen being connected to the deflaker device, comprising a further pressure screen (first portion of the device 24 or the device 60, respectively) for the rejects material between the rejects material outlet (23;58) of the main stream pressure screen (20;50) and the deflaker device (second portion of the device 24 or the device 60, respectively), the further pressure screen having openings of smaller dimensions than those of the main stream pressure screen and the rejects material space of the further pressure screen being in communication with the deflaker device.

4. Apparatus according to claim 3, the accepted stock outlet (24b;62) of the further pressure screen (first portion of the device 24 or the device 60, respectively) and the accepted stock outlet (20b';56) of the main stream pressure screen (20;50) communicating with each other.

5. Apparatus according to claim 3, characterized in that the outlet (28;64) of the deflaker device (second portion of the device 24 or the device 60, respectively) is connected to a sorting device (30;66), with an accepted stock outlet into the return line.

6. Apparatus according to claim 3, the screen of the main pressure screen (20) being constructed as a screen with holes.

7. Apparatus according to claim 3, the screen of the further pressure screen (first portion of the device 24) being constructed as a screen with holes.

8. Apparatus for preparing and cleaning fibrous suspensions comprising a first main stream pressure screen (20) suitable for operating in the high consistency range, the rejects material outlet (20b") of which is connected to a first rejects material pressure screen (first portion of the device 24) the rejects material space of the first rejects material pressure screen being in connection with a first deflaker device (second portion of the device 24), the accepted stock outlet (20b') of the first main stream pressure screen (20) and the accepted stock outlet (26) of the first rejects material pressure screen (first portion of the divide 24) being connected and followed by a second main stream pressure screen (50) operating in the low consistency range, the rejects material outlet (58) of which is connected to a second rejects material pressure screen (first portion of the device 60) the accepted stock outlet (62) of which is in communication with the accepted stock outlet (56) of the second main stream pressure screen (50).

9. Apparatus according to claim 8, the rejects material space of the second rejects material pressure screen (first portion of the device 60) being in communication with a second deflaker device (second portion of the device 60) the outlet (64) of which is in communication with the accepted stock outlet (20b') of the first main stream pressure screen (20).

10. Apparatus according to claim 8, the inlet (54) of the second main stream pressure screen (50) being preceded by a further main stream pressure screen (40) operating in the low consistency range, the accepted stock outlet (52) of which is in communication with the accepted stock outlet (56) of the second main stream pressure screen (50), and the rejects material outlet (54) of which is connected to the inlet of the second main stream pressure screen (50).

11. Apparatus according to claim 10, the screen of the further main stream pressure screen (40) having slot-shaped openings.

12. Apparatus according to claim 8, the screen of the first main stream pressure screen (20) being constructed as a screen with holes.

13. Apparatus according claim 8, the screen of the first rejects material pressure screen (first portion of the device 24) being constructed as a screen with holes.

14. Apparatus according to claim 8, the screen of the second main stream pressure screen (50) having slot-shaped openings.

15. Apparatus according to claim 8, the screen of the second rejects material pressure screen (first portion of the device 60) having slot-shaped openings of less width than the screen of the second main stream pressure screen (50).

16. A system for preparing and cleaning fibrous suspensions containing agglomerates of fibres, said system comprising a main stream screening device having a screen, an inlet, a first outlet for accepted stock and a second outlet for rejected stock, first feed means for conducting a feed stream of a fibrous suspension into said inlet; a second screening device having a screen, an inlet for the suspension to be processed, a first outlet for accepted stock, and a second outlet for rejected stock feed means for connecting the second outlet of said main stream screening device to the inlet of said second screening device; a deflaker for dissipating said fibre agglomerates, means for feeding the stock rejected by said second screening device into the deflaker; the screen of said second screening device comprising openings of smaller dimensions than the openings of the screen of said main screening device.

* * * * *